United States Patent [19]
Fortier

[11] Patent Number: 6,062,579
[45] Date of Patent: May 16, 2000

[54] RETROFITTABLE SUSPENSION SYSTEM FOR THE REAR AXLE OF A VEHICLE

[76] Inventor: Paul Henri Fortier, 814, boul. St. Joseph Est, Montréal, Quéec, Canada, H2J 1K4

[21] Appl. No.: 09/056,089

[22] Filed: Apr. 7, 1998

[51] Int. Cl.[7] .............................. B60G 11/00; B60G 17/00
[52] U.S. Cl. .................. 280/124.1; 280/124.131; 280/124.153; 280/124.16; 267/31; 267/64.28; 267/64.19
[58] Field of Search .................. 280/124.1, 124.128, 280/124.131, 124.153, 124.157, 124.16, 124.161, 124.17, 6.157, 6.159, 678, 683, 686, 680; 267/31, 32, 24, 218, 64.19, 64.23, 64.28

[56] References Cited

U.S. PATENT DOCUMENTS

| | | | |
|---|---|---|---|
| 3,003,781 | 10/1961 | Black | 280/686 |
| 3,556,554 | 1/1971 | Cyril | 280/124 |
| 3,785,673 | 1/1974 | Harbers, Jr. et al. | 280/124 F |
| 3,909,036 | 9/1975 | Pound | 280/124 F |
| 4,256,326 | 3/1981 | Cantrell et al. | 280/683 |
| 4,773,670 | 9/1988 | Raidel, II | 280/688 |
| 4,923,210 | 5/1990 | Heider et al. | 280/707 |
| 4,998,749 | 3/1991 | Bockewitz | 267/31 |
| 5,346,247 | 9/1994 | Snyder | 280/712 |
| 5,351,986 | 10/1994 | Hedenberg et al. | 280/712 |
| 5,362,095 | 11/1994 | Evely | 280/712 |
| 5,403,031 | 4/1995 | Gottschalk et al. | 280/124.157 |
| 5,403,032 | 4/1995 | Hellwig | 267/31 |
| 5,755,456 | 5/1998 | Blazek et al. | 280/683 |
| 5,791,681 | 8/1998 | VanDenberg | 280/683 |

*Primary Examiner*—Paul N. Dickson
*Assistant Examiner*—Lynda Jasmin
*Attorney, Agent, or Firm*—Gilberto M. Villacorta, Ph.D; Irah H. Donner; Pepper Hamilton LLP

[57] ABSTRACT

The rear axle suspension system is retrofittably attachable to spaced-apart suspension mountings of an ambulance type of vehicle. The suspension system has an axle bearing arm having a first end that pivotally connects with one of the suspension mountings, and an opposite second end. A complementary arm has a first end that pivotally connects with the other one of the suspension mountings, and an opposite second end pivotally connected to the second end of the axle bearing arm. An axle bracket is secured to the axle bearing arm at or near the second end thereof, to receive the rear axle. A pair of spaced-apart absorber bearing arms downwardly project respectively from the axle bearing and complementary arms and face each other. A shock absorber is mounted between the absorber bearing arms.

13 Claims, 4 Drawing Sheets

RETROFITTABLE SUSPENSION SYSTEM FOR THE REAR AXLE OF A VEHICLE

FIELD OF THE INVENTION

This invention relates in general to vehicle suspension arrangements, and more particularly to a suspension system for the rear axle of a vehicle, retrofittably attachable to spaced-apart suspension mountings like those found for example on ambulance and delivery truck chassis.

BACKGROUND

To cut manufacturing costs and provide better purchase deals, ambulance manufacturers usually use a pickup truck that they convert into an ambulance by adding a box over the pickup bed, emergency lights and horns, medical equipment, etc. This conversion is carried out without changing the base structural components of the pickup, like the suspension system which is usually of the spring blade type. With all the medical equipment load and the sever drive conditions, the suspension is put to heavy test, and is subjected to damageable shocks. The ambulance is likely to continuously swing during travel, which is highly uncomfortable for the passengers and the driver. This also causes spring sag and vehicle instability.

Known in the art are U.S. Pat. No. 3,556,554 (Saward); U.S. Pat. No. 3,785,673 (Harbers, Jr. et al.); U.S. Pat. No. 3,909,036 (Pound); U.S. Pat. No. 4,256,326 (Cantrell et al.); U.S. Pat. No. 4,923,210 (Heider et al.); U.S. Pat. No. 5,346,247 (Snyder); U.S. Pat. No. 5,351,986 (Hedenberg et al.); and U.S. Pat. No. 5,362,095 (Eveley), which all disclose various types of air assisted suspensions. In all the cases, the air shock absorber or pneumatic spring, generally in the form of an air bag, is mounted between the suspension arms and the vehicle chassis, thus requiring substantial structural adaptations on the vehicle chassis to accommodate the mounting of the suspension.

SUMMARY

One object of the present invention is to provide a suspension system for a rear axle of a vehicle, retrofittably attachable to spaced-apart suspension mountings like those found for example on ambulance and delivery truck chassis.

The suspension system according to the present invention comprises:

- an axle bearing arm having a first end provided with means for pivotal connection with one of the mountings, and an opposite second end;
- a complementary arm having a first end provided with means for pivotal connection with the other one of the mountings, and an opposite second end pivotally connected to the second end of the axle bearing arm;
- an axle bracket secured to the axle bearing arm at or near the second end thereof, to receive the rear axle;
- a pair of spaced-apart absorber bearing arms downwardly projecting respectively from the axle bearing and complementary arms and facing each others; and
- a shock absorber mounted between the absorber bearing arms.

BRIEF DESCRIPTION OF THE DRAWINGS

A detailed description of preferred embodiments of the invention will be given herein below with reference to the following drawings, in which like numbers refer to like elements.

DETAILED DESCRIPTION OF PREFERRED EMBODIMENTS

Figure 1:
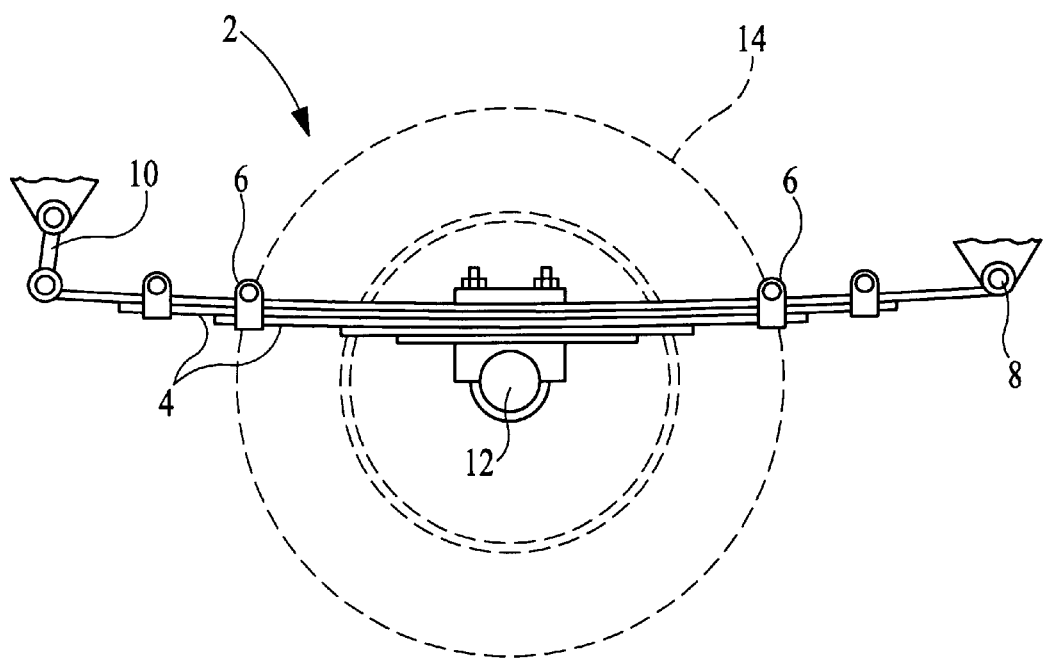
FIG. 1 is a side elevation view of a spring blade type suspension of the prior art.

Referring to FIG. 1, which is illustrative of the prior art, most of the listing ambulance vehicles are presently equipped with a standard suspension 2 which comprises a number of spring blades 4. The spring blades 4 are held together with brackets 6. The assembly made of the blades 4 has one end mounted to the chassis of the vehicle about a pivot mounting 8 and an opposite end mounted by means of a shackle 10. The axle 12 bearing the wheels 14 of the vehicle is mounted onto the middle of the spring blades assembly so that when the wheels 14 hit a bump, an upward pressure is exerted on the spring blades 4 that absorb, in part, the shock. In practice, such a conventional system is efficient enough for normal pickup truck applications even though it absorbs only a minor amount of shock. For ambulance or delivery applications, it becomes insufficient and a new kind of suspension is highly desirable.

The suspension system according to the present invention, as it will become apparent hereinafter, can be substituted in a retrofit manner to the conventional spring blade assembly described hereinabove. The suspension system of the invention has been tested under confidentiality with success and has proven to absorb a higher amount of shock, thereby providing a smoother ride. It increases the vehicle stability and provides comfort and safety for the passengers.

Figure 2:
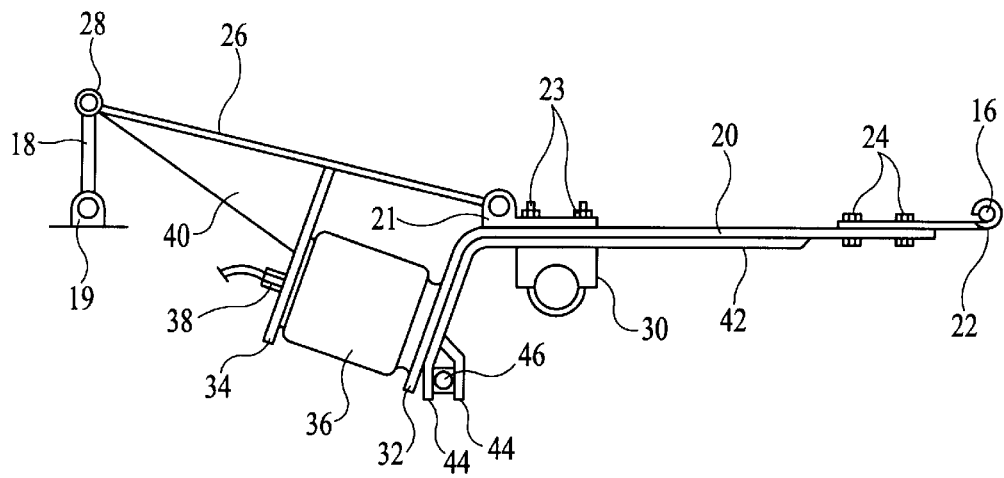
FIGS. 2 and 3 are side elevation views of a suspension system according to the invention, at rest and when the wheels hit a road bump, respectively.
Figure 3:
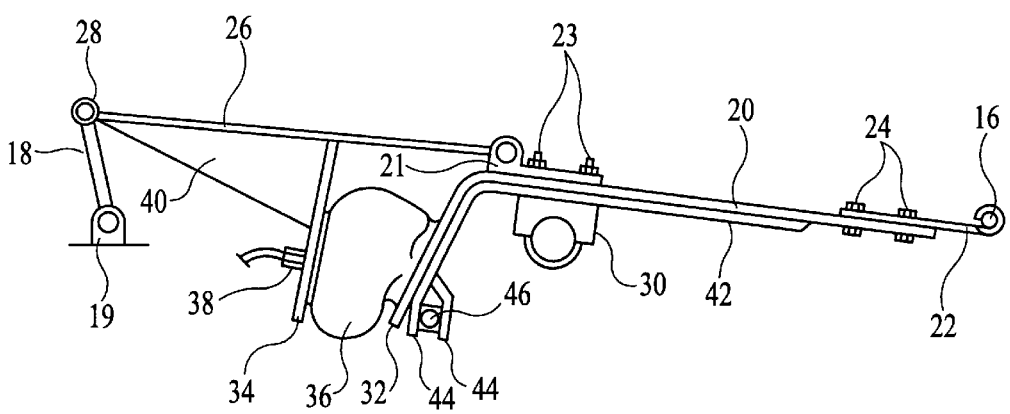
Figure 4:
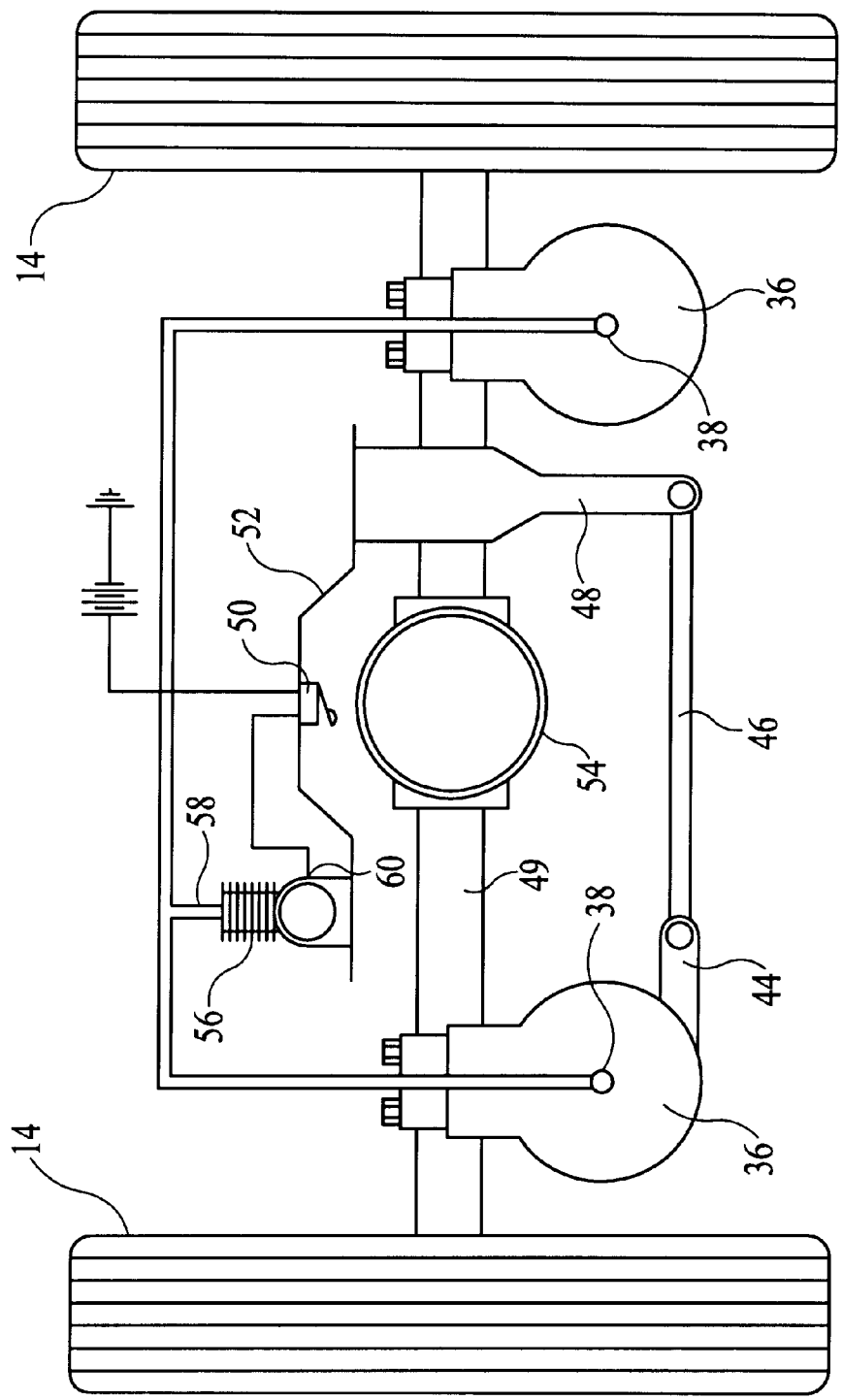
FIG. 4 is a sectional view through the vehicle showing the rear axle, the suspension system according to the invention, and the air compressor circuit for the suspension system.
Figure 5:
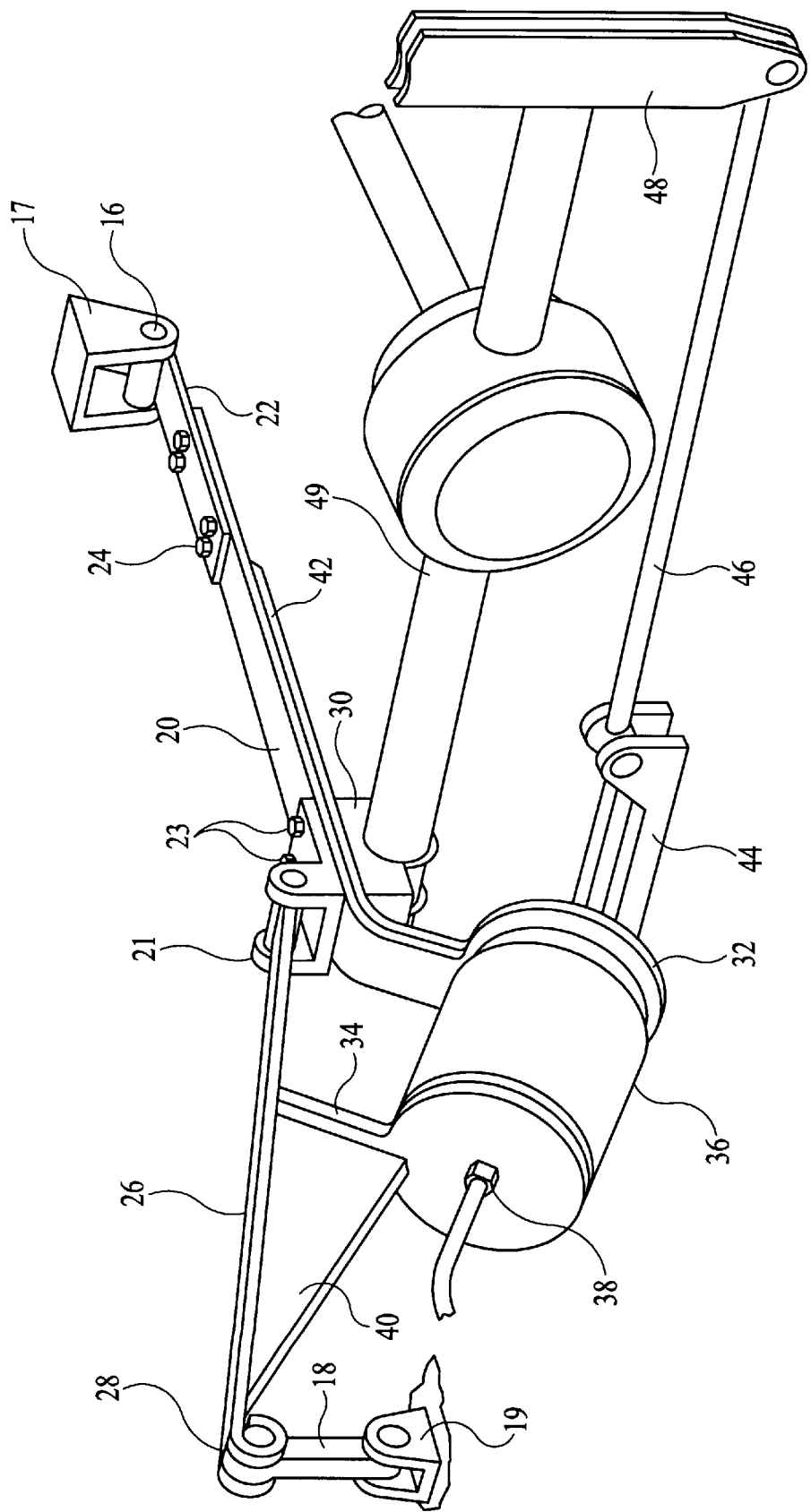
FIG. 5 is a perspective view of a suspension system according to the invention, with a transverse stabilizer bar.

Referring to FIGS. 2 and 3, there is shown a suspension system according to the present invention, at rest and when the wheels 14 of the vehicle (as shown in FIG. 4) hit a road bump, respectively. The suspension system is retrofittably attachable to conventional spaced-apart suspension mountings 16, 18. The suspension mountings 16, 18 illustrated in the Figures are respectively in the form of a spring bracket pin (16) and a shackle (18) pivotally secured to the chassis of the vehicle by means of suitable brackets or hangers 17, 19 as shown in FIG. 5. The suspension system has an axle bearing arm 20 having a first end provided with a coupling element in the form of a blade 22 for pivotal connection about the pin 16, and an opposite second end. The blade 22 can be secured to the axle bearing arm 20 by means of bolts 24. The blade 22 could be solid with the axle bearing arm 20 or welded therewith. The suspension system has a complementary arm 26 having a first end provided with a wrapped-around fold 28 or any other suitable element for pivotal connection with the shackle 18, and an opposite second end pivotally connected to the second end of the axle bearing arm 20 by means of a bracket 21 secured to the axle bearing arm 20 with U-shaped bolts 23. An axle bracket 30 is secured to the axle bearing arm 20 at or near the second end thereof, to receive the rear axle 49 of the vehicle, as shown in FIG. 5. A pair of spaced-apart absorber bearing arms 32, 34 downwardly project respectively from the axle bearing and complementary arms 20, 26 and face each other. The absorber bearing arms 32, 34 can be solid with the respective axle bearing and complementary arms 20, 26. A shock absorber 36 is mounted between the absorber bearing arms 32, 34. Preferably, the shock absorber 36 is formed of a balloon-type air shock absorber having an inlet port 38 to receive compressed air. Depending on the suspension requirement, a simple coil spring can be used to form the shock absorber 36.

The complementary arm 26 is provided with a downwardly projecting angle flange 40 having a side in abutment with the absorber bearing arm 34, to straighten the assembly.

The absorber bearing arm 34 projects at or almost at right angle with respect to the complementary arm 20 at a distance from the second end thereof that corresponds substantially to a height of the shock absorber 36 at rest, as shown in FIG. 2. The absorber bearing arm 32 projects at the second end of the axle bearing arm 20 at an angle where both absorber bearing arms 32, 34 are generally parallel when the shock absorber is at rest, as shown in FIG. 2. In this configuration, the air shock absorber 36 exhibits its natural form when at rest as shown in FIG. 2, and deforms as shown in FIG. 3 when the wheels 14 hit a road bump.

Preferably, an elongated reinforcement arm 42 longitudinally extends against the axle bearing arm 20 and the absorber bearing arm 32, to straighten them.

The absorber bearing arm 32 has a lower end that can be provided with a transverse stabilizer bar bracket 44.

Referring to FIG. 5, there is shown a transverse stabilizing bar 46 having an end pivotally connected to the transverse stabilizer bar bracket 44, and an opposite end for pivotal connection to a stabilizer bar attachment 48 of the vehicle.

Referring to FIG. 4, there are shown a pair of suspension systems according to the present invention, installed for the rear axle 49 of the vehicle. A detector in the form of a pressure switch 50 is used to detect an insufficient pressure level in the air shock absorbers 36. The pressure switch 50 is mounted under the chassis 52 of the vehicle above the rear axle 49, in the present case just over the differential 54, to produce a control signal as a function of a pressure exerted by the rear axle 49 on the pressure switch 50. A compressor 56 responsive to the detector, has a compressed air outlet 58 connected to the inlet ports 38 of the air shock absorber 36. The compressor 56 has a control input 60 connected to the pressure switch 50 to receive the control signal. With air pressure, specific height levels of the chassis 52 with respect to ground can be maintained through all load conditions.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A suspension system for a rear axle of a vehicle, retrofittably attachable to spaced-apart suspension mountings, comprising:

an axle bearing arm having a first end provided with means for pivotal connection with one of the suspension mountings, and an opposite second end;

a complementary arm having a first end provided with means for pivotal connection with the other one of the suspension mountings, and an opposite second end pivotally connected to the second end of the axle bearing arm;

an axle bracket secured to the axle bearing arm at or near the second end thereof, to receive the rear axle;

a pair of spaced-apart absorber bearing arms downwardly projecting respectively from the axle bearing and complementary arms and facing each other; and a shock absorber mounted between the absorber bearing arms.

2. The vehicle suspension system according to claim 1, wherein the shock absorber comprises an air shock absorber having an inlet port to receive compressed air.

3. The vehicle suspension system according to claim 2, further comprising:

a detector means for detecting an insufficient pressure level in the air shock absorber; and a compressor responsive to the detector means, the compressor having a compressed air outlet connected to the inlet port of the air shock absorber.

4. The vehicle suspension system according to claim 3, wherein:

the detector means comprises a pressure switch mounted under a chassis portion of the vehicle above the rear axle, to produce a control signal as a function of a pressure exerted by the rear axle on the pressure switch; and the compressor has a control input connected to the pressure switch to receive the control signal.

5. The vehicle suspension system according to claim 2, wherein:

the complementary arm is provided with a downwardly projecting angle flange having a side in abutment with the absorber bearing arm projecting from the complementary arm;

the absorber bearing arm projecting from the complementary arm, projects at a substantially right angle with respect thereto at a distance from the second end thereof that corresponds substantially to a height of the shock absorber at rest, the absorber bearing arm projecting from the complementary arm being solid therewith; and the absorber bearing arm projecting from the axle bearing arm, projects at the second end thereof at an angle where both absorber bearing arms are substantially parallel when the shock absorber is at rest, the absorber bearing arm projecting from the axle bearing arm being solid therewith, the absorber bearing arm projecting from the axle bearing arm has a lower end provided with a transverse stabilizer bar bracket;

the vehicle suspension system further comprising:

an elongated reinforcement arm longitudinally extending against the axle bearing arm and the absorber bearing arm projecting therefrom.

6. The suspension system according to claim 5, further comprising:

a transverse stabilizing bar having an end pivotally connected to the transverse stabilizer bar bracket, and an opposite end for pivotal connection to a stabilizer bar attachment of the vehicle;

a detector means for detecting an insufficient pressure level in the air shock absorber, the detector means comprising a pressure switch mounted under a chassis portion of the vehicle above the rear axle, to produce a control signal as a function of a pressure exerted by the rear axle on the pressure switch; and a compressor responsive to the detector means, the compressor having a compressed air outlet connected to the inlet port of the air shock absorber, and a control input connected to the pressure switch to receive the control signal.

7. The vehicle suspension system according to claim 1, wherein the complementary arm is provided with a downwardly projecting angle flange having a side in abutment with the absorber bearing arm projecting from the complementary arm.

8. The vehicle suspension system according to claim 1, wherein:

- the absorber bearing arm projecting from the complementary arm, projects at a substantially right angle with respect thereto at a distance from the second end thereof that corresponds substantially to a height of the shock absorber at rest; and
- the absorber bearing arm projecting from the axle bearing arm, projects at the second end thereof at an angle where both absorber bearing arms are substantially parallel when the shock absorber is at rest.

9. The vehicle suspension system according to claim 1, wherein the absorber bearing arm projecting from the axle bearing arm is solid therewith.

10. The vehicle suspension system according to claim 1, wherein the absorber bearing arm projecting from the complementary arm is solid therewith.

11. The vehicle suspension system according to claim 1, further comprising an elongated reinforcement arm longitudinally extending against the axle bearing arm and the absorber bearing arm projecting therefrom.

12. The vehicle suspension system according to claim 1, wherein the absorber bearing arm projecting from the axle bearing arm has a lower end provided with a transverse stabilizer bar bracket.

13. The vehicle suspension system according to claim 12, further comprising a transverse stabilizing bar having an end pivotally connected to the transverse stabilizer bar bracket, and an opposite end for pivotal connection to a stabilizer bar attachment of the vehicle.

\* \* \* \* \*